United States Patent [19]
Meeker et al.

[11] Patent Number: 5,458,398
[45] Date of Patent: Oct. 17, 1995

[54] INFANT CAR SEAT WITH RECESSED BELT PATH

[75] Inventors: Paul K. Meeker, Hiram; William R. Gibson, Canton, both of Ohio

[73] Assignee: Lisco, Inc., Tampa, Fla.

[21] Appl. No.: 342,564

[22] Filed: Nov. 21, 1994

[51] Int. Cl.⁶ .............................. A47C 1/08; A47D 1/10
[52] U.S. Cl. ............................. 297/250.1; 297/256.13; 297/256.14
[58] Field of Search .................... 297/250.1, 219.12, 297/256.14, 254, 256.13

[56] References Cited

U.S. PATENT DOCUMENTS

| | | |
|---|---|---|
| 3,563,600 | 2/1971 | Converse . |
| 4,754,999 | 7/1988 | Kain . |
| 4,770,468 | 9/1988 | Shubin . |
| 4,984,845 | 1/1991 | Knoedler et al. . |
| 5,098,161 | 3/1992 | Minami et al. . |
| 5,286,086 | 2/1994 | Gunji . |

Primary Examiner—Kenneth J. Dorner
Assistant Examiner—Rodney B. White
Attorney, Agent, or Firm—Donald R. Bahr; John E. Benoit

[57] ABSTRACT

A child's car seat having a recessed area in the back through which the vehicle seat belt passes. Apertures in the left and right sides of the recessed area allow the vehicle seat belt to be threaded through one opening, across the recessed area, and through the other opening. The recess is partially covered with a molded panel leaving a restricted opening at the bottom of the recessed belt path with the opening sufficient to allow the vehicle seat belt to be threaded from the front of the seat. The padding covering the seat has a slit adjacent the restricted opening.

4 Claims, 2 Drawing Sheets

FIG. 3
FIG. 4
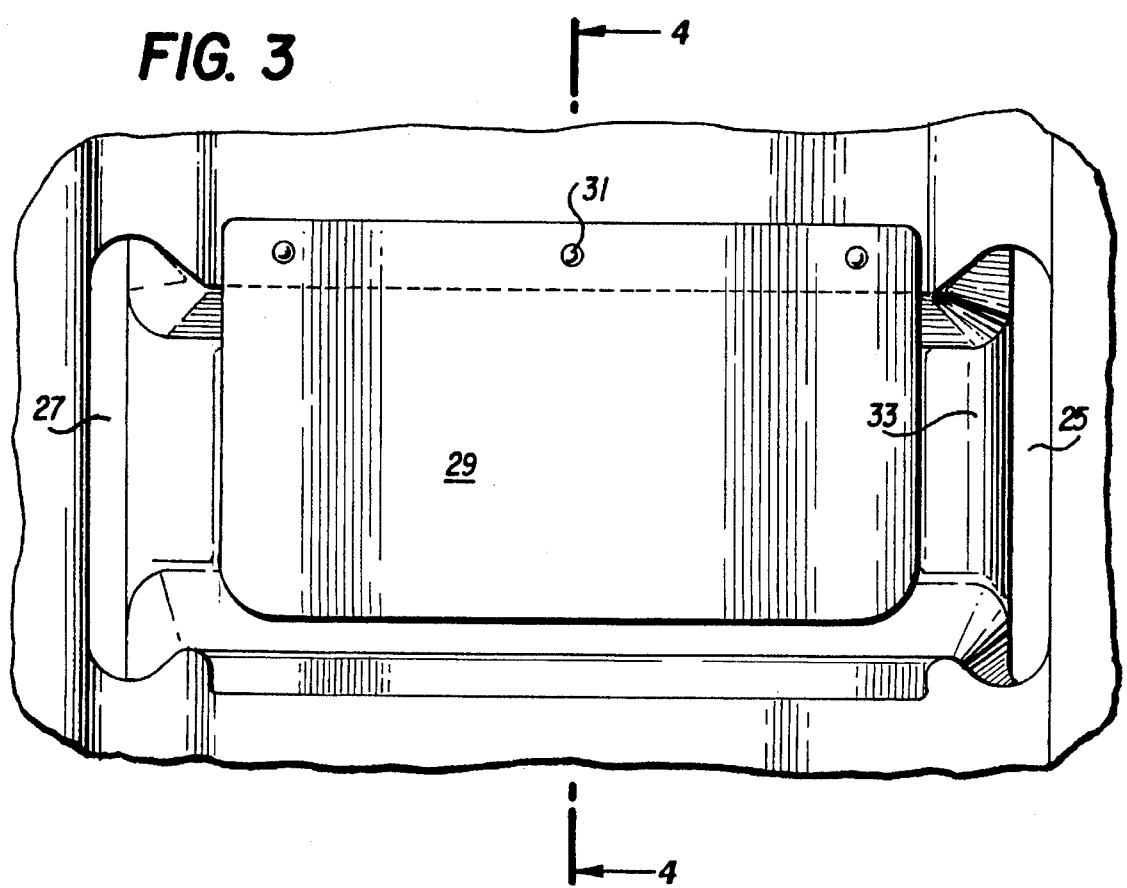
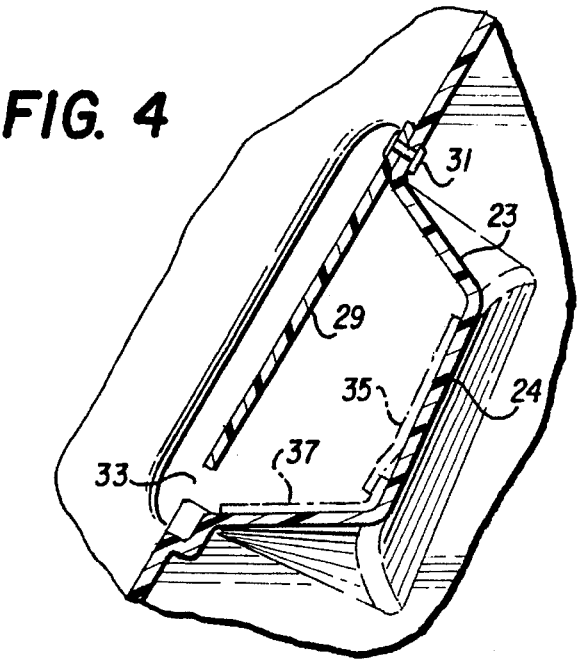

1

INFANT CAR SEAT WITH RECESSED BELT PATH

This invention pertains generally to infant or toddler car seats, and more specifically to such seats which include a recessed belt path for accepting the safety belts of a vehicle.

BACKGROUND OF THE INVENTION

A typical infant car seat is secured to a vehicle such as an automobile with the automobile seat belt. Under standard procedure, the automobile seat belt passes through two opposed openings in the side rails of the infant car seat and behind the rear of the seating surface of the seat. In the usual construction of these seats, the two openings are not connected and offer no support or "path" for the automobile seat belt as it passes from one opening to the other opening.

The normal procedure for installing the automobile seat belt behind the seating surface of the infant car seat and through the two openings is difficult. The retractor of the automobile seat belt puts tension on the belt while it is being threaded through the openings. In addition, the path through the infant car seat is relatively inaccessible and usually does not include a supporting surface.

U.S. Pat. No. 5,286,086 issued Feb. 15, 1994, to Gunji provides one solution to the problems discussed above in that he provides seat belt holes in the sides of a lower rear part of the child seat unit through which seat belts are placed to allow the auxiliary child seat unit to be stably fastened to an interior of the vehicle. A seat belt connection opening is provided within the auxiliary child seat unit between the seat belt holes wherein the seat belts are attached by an engagement mechanism provided on the seat belts. Since Gunji uses a substantial opening in the back of the seat, he must provide some covering so that the child will not be uncomfortable and, further, so that the child will not have access to the belt itself. Accordingly, he covers this opening with a cover plate which is rotatably attached to the back of the seat above the opening by means such as hinges or the like so that the cover plate is rotated to the position which covers the seat belt connection opening, or uncovers it while the seat belt is being used. With this type of structure, Gunji necessarily must provide any cushioning material with a flap which also is substantially the size of the hinged plate.

The present invention avoids the use of hinges on a plate and the necessity of a large flap in the cushion covering so as to reduce the complexity of connecting the infant seat to the vehicle and, at the same time, provides a seat which avoids the unnecessary costs of the additional hinges and other hardware.

BRIEF SUMMARY OF THE INVENTION

The present invention provides an infant car seat having a recessed area in the back through which the vehicle seat belt passes. Apertures in the left and right sides of the recessed area allow the vehicle seat belt to be threaded through one opening, pass across the recessed area, and exit through the other opening. The recess is partially covered with a fixed molded panel, leaving a restricted opening at the bottom of the recessed belt path sufficient to allow the vehicle seat belt to be threaded from the front of the seat. The padded covering of the seat has a slit adjacent the opening of the bottom of the belt path so as to provide access to the belt path when the automobile seat belt is threaded therethrough.

BRIEF DESCRIPTION OF THE DRAWINGS

FIG. 3 is an enlarged view of the central portion of the back of the car seat of FIG. 1;

FIG. 4 is a sectional view taken through the lines 4—4 of FIG. 3; and

DETAILED DESCRIPTION OF THE PREFERRED EMBODIMENT

Figure 1:
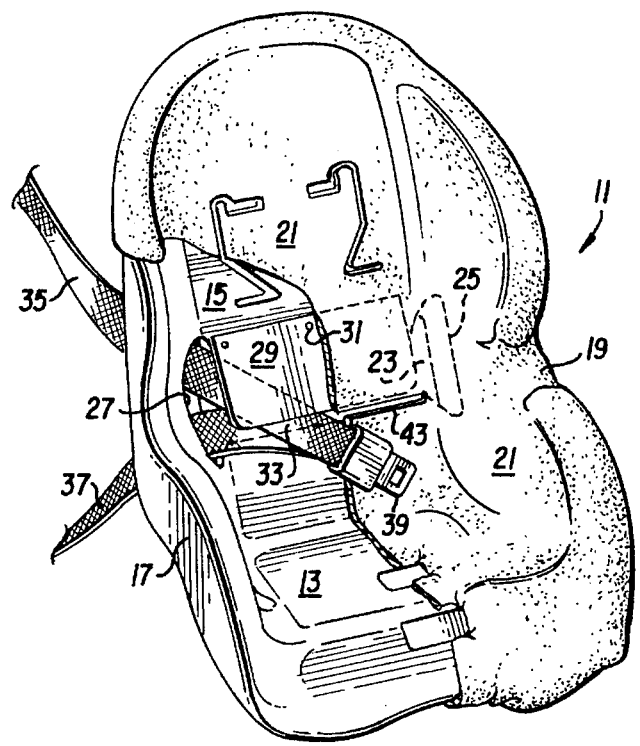
FIG. 1. is a perspective view of one embodiment of the infant seat of the present invention.

Referring to FIG. 1, there is shown a perspective view of the seat of the present invention with the padding partially removed to show details of the infant car seat itself. Infant car seat 11 includes seat 13, back 15, and side rails 17, 19 with padding 21 shown in place.

Back 15 includes recessed wall 23, shown more clearly in FIG. 4, with the recessed wall having at either end apertures 25 and 27.

Plate 29, which is of a rigid structure, extends substantially between apertures 25 and 27 and downwardly so as to cover the majority of the recessed wall. This leaves restricted opening 33 for automobile seat belt access, as described below. Plate 29 is shown as secured to the upper edge of the recess by means such as rivets 31 or the like. Other means may be used to secure the plate, or it may be molded into the seat itself. Plate 29 is of a dimension so as to create restricted opening 33 so as to provide access to the inside of the recessed area.

The structure discussed above is designed so as to provide a means for threading standard automobile restraining belts through aperture 27, across the back section of recessed wall 23, and out through aperture 25. In FIG. 1, shoulder belt 35 and lap belt 37 are shown in the process of being threaded to the final position. Restricted opening 33 is of a sufficient width so as to permit the passage of shoulder belt 35 and seat belt 37, but small enough to prevent hand access to the recessed area by the child occupant. Belts 35 and 37 are shown as ending in a male section 39 of a buckle which mates with female section 41, as shown in FIG. 5 when the final connection is made.

Figure 5:
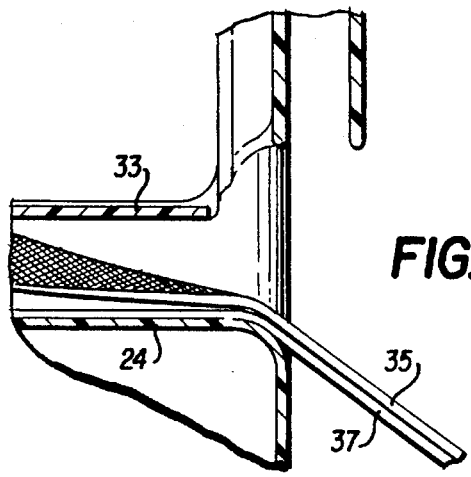
FIG. 5 is a partial sectional view taken through the lines 5—5 of FIG. 2.

FIG. 5 is an enlarged partial sectional view showing aperture 25, plate 33 and the associated recessed area, including back section 24.

Referring to FIGS. 3 and 4, there is shown an enlarged view of restricted opening 33, apertures 25 and 27, plate 29, back section 24, and rivets 31. Since back section 24 extends across the entire back of the seat between the apertures, it provides support for the seat belt when it is secured in place. As can be seen, the ends of back section 24 are rounded so as to provide a non-abrasive surface for the automobile seat belt itself.

Figure 2:
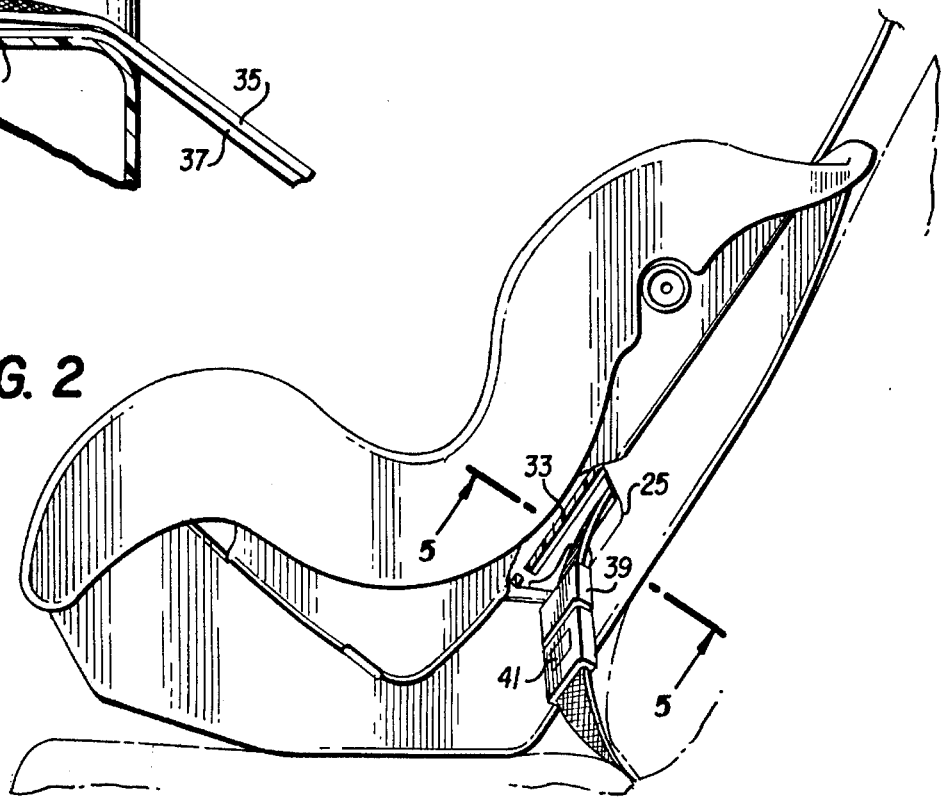
FIG. 2 is a side view of the car seat of FIG. 1.

FIG. 5 is a sectional view taken through the lines 5—5 of FIG. 2 and shows detail of belts 35 and 37 resting against back section 24.

Since the recessed area of the toddler car seat is directly behind the seating position of the child, it could present uncomfortable contours if left in that condition. For this reason, the recess is partially covered with panel 29. Preferably, panel 29 leaves restricted opening 33 approximately 1" to 1½" high at the bottom of the recessed belt path. This opening is sufficiently large to allow the automobile seat belt to be threaded therethrough, but not sufficiently large to be uncomfortable once a pad is in place on the toddler car seat. Padding 21 is provided with slit 43 so as to give access to the restricted opening in the seat in order that the seat belt can be threaded from the front without removing the padding.

The above structure provides a belt path that is a solid, concave surface which supports the automobile seat belt during installation and defines an explicit path for the automobile belt. It is superior in that most prior belt paths have an unsupported distance between two openings, which make it necessary for the installer to support and guide the belt during installation.

As stated above, the present invention avoids the necessity of prior seats wherein belt paths were accessed from behind or beside the infant car seat, making it necessary to "fish" the automobile seat belt through the car seat. Additionally, a fixed cover is provided for the belt path, providing a comfortable seating surface and eliminating any moving parts, which are subject to damage during use.

The above description and drawings are illustrative only since components of the invention could be varied without departing from the invention, the scope of which is to be limited only by the following claims.

We claim:

1. A seat for securing a child in a vehicle comprising a body, said body comprising a seat;

a back extending from the rear of said seat;

a recessed wall connected to and extending across said back;

an aperture at each outer end of said recessed wall for providing a passageway for vehicular seat belts;

a plate connected at one edge to said back adjacent one edge of said recessed wall, said plate being of a dimension so as to cover a substantial portion of said passageway with the edge of said plate opposite said one edge terminating short of the opposite edge of said recessed wall so as to provide a restricted opening to said passageway.

2. The seat of claim 1 wherein said plate is secured to said back by rivets.

3. The seat of claim 1 further comprising a padded material covering said seat and back; and a slit in said material adjacent to said restricted opening.

4. The seat of claim 1 wherein said opening is rectangular and has a width of less than 1½".

\* \* \* \* \*